United States Patent
Ohmura et al.

[11] Patent Number: 6,151,583
[45] Date of Patent: Nov. 21, 2000

[54] WORKFLOW MANAGEMENT METHOD AND APPARATUS

[75] Inventors: Yoshihide Ohmura, Yokohama; Takashi Kobayashi, Kawasaki; Katsuaki Sakai, Tokyo; Nobuo Nagai; Shoko Ogoshi, both of Kawasaki, all of Japan

[73] Assignee: Hitachi, Ltd., Tokyo, Japan

[21] Appl. No.: 08/938,785

[22] Filed: Sep. 26, 1997

[30] Foreign Application Priority Data

Sep. 27, 1996 [JP] Japan .................................. 8-256039

[51] Int. Cl.⁷ .................................................. G06F 17/60
[52] U.S. Cl. ...................................... 705/8; 705/9; 705/11
[58] Field of Search ................................ 705/1, 8, 45, 7, 705/9, 11; 395/200.32, 182.13, 680

[56] References Cited

U.S. PATENT DOCUMENTS

| | | | |
|---|---|---|---|
| 5,754,857 | 5/1998 | Gadol | 395/680 |
| 5,761,404 | 6/1998 | Murakami et al. | 395/182.13 |
| 5,768,506 | 6/1998 | Randell | 395/200.32 |
| 5,799,297 | 8/1998 | Goodridge et al. | 707/1 |
| 5,812,989 | 9/1998 | Witt et al. | 707/45 |
| 5,826,020 | 10/1998 | Randell | 395/200.32 |
| 5,826,239 | 10/1998 | Du et al. | 705/8 |

FOREIGN PATENT DOCUMENTS 8123744  5/1996  Japan .

*Primary Examiner*—James P. Trammell
*Assistant Examiner*—Yehdega Retta
*Attorney, Agent, or Firm*—Antonelli, Terry, Stout & Kraus LLP

[57] ABSTRACT

A workflow management method in a workflow system including a workflow server and tables for holding processes includes storing in a table a plurality of definition information sets for individually defining workflows for a plurality of processes included in a job for processing a plurality of works to be circulated, wherein the plurality of definition information sets each have a process ID, a process name, and a user role ID, and at least one of the plurality of definition information set has predetermined data for connecting processing defined by another definition information set in the user role ID, and storing in a table a work management information set created for each of the plurality of works subjected to processing by the job, the work management information set having a process ID, a process name, a user role ID, and a flag representative of whether or not workflow processing corresponding to processing of each work has been terminated. The process ID has a process ID indicative of the location of the other definition information set when the user role ID includes the first predetermined code indicating that the workflow processing is defined in the other definition information set. After copying and updating one of the plurality of stored definition information sets, the one definition information set can be stored in the table. A table can be provided for storing therein a process management information set having a utilization permission flag indicative of whether or not the plurality of definition information sets, stored in the table, may be copied. A table can also be provided for storing a suspended work information set including an ID of one of the plurality of works to be circulated, and a workflow ID indicative of a workflow in which the one work should be suspended.

29 Claims, 11 Drawing Sheets

GENERAL BLOCK DIAGRAM

GENERAL BLOCK DIAGRAM

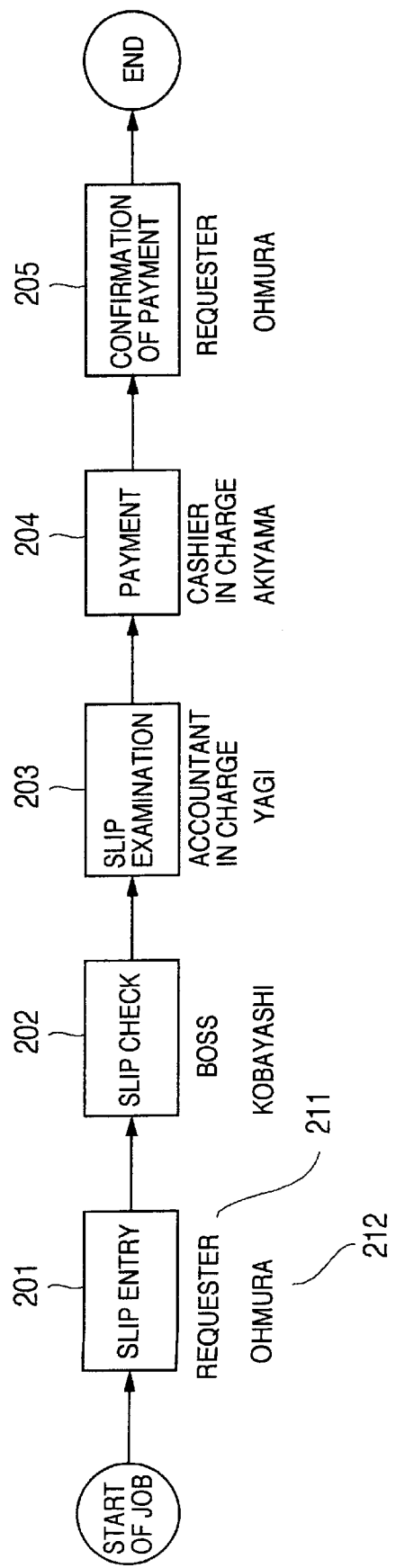

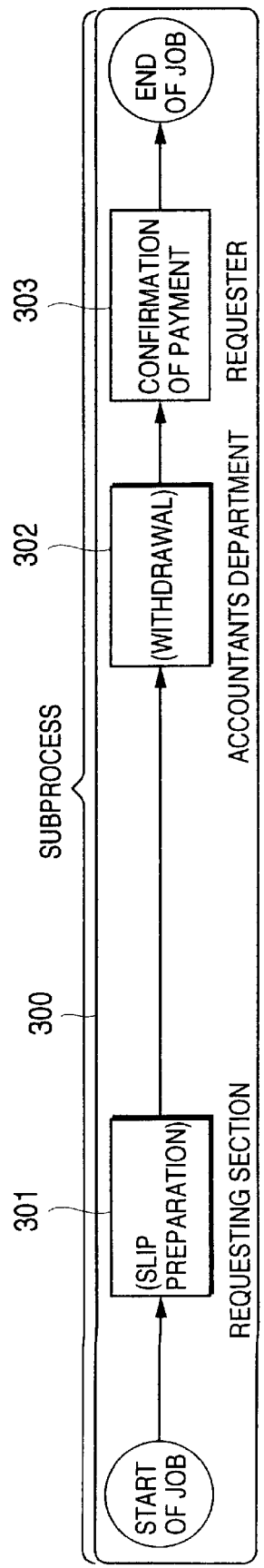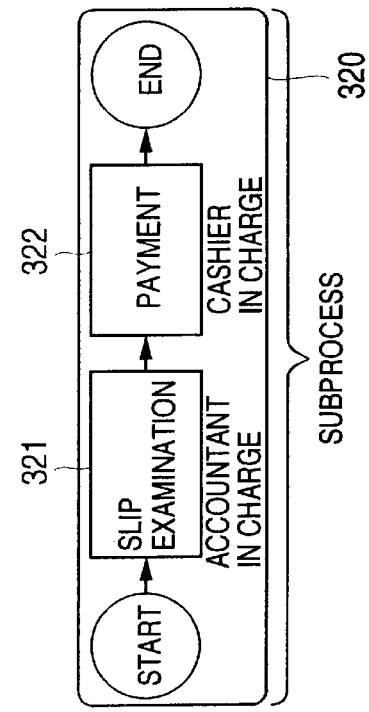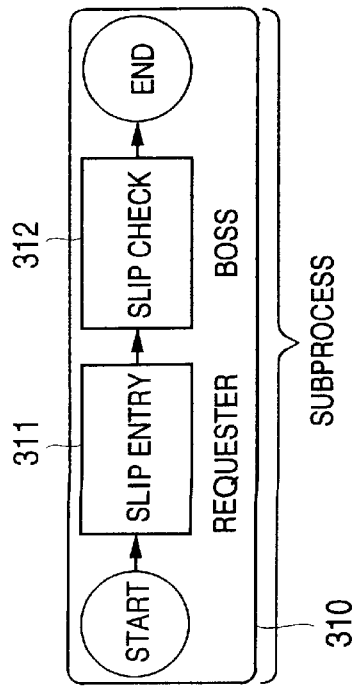

FIG.4
PROCESS TABLES

900

| PROCESS NAME | PROCESS ID | VERSION NUMBER |
|---|---|---|
| WITHDRAWAL JOB | 0001-0001 | 1 |

| NODE/PROCESS ID | NODE/PROCESS NAME | USER ID (HIERARCHY FLAG) | VERSION NUMBER |
|---|---|---|---|
| 0002-0001 | SLIP PREPARATION | (NULL) | 1 |
| (NULL) | WITHDRAWAL | (NULL) | 0 |
| 0004-0001 | CONFIRMATION | ohmura | 1 |

920

| PROCESS NAME | PROCESS ID | VERSION NUMBER |
|---|---|---|
| SLIP PREPARATION | 0002-0001 | 1 |

| NODE/PROCESS ID | NODE/PROCESS NAME | USER ID (HIERARCHY FLAG) | VERSION NUMBER |
|---|---|---|---|
| 0005-0001 | SLIP ENTRY | ohmura | 1 |
| 0006-0001 | SLIP CHECK | kobayashi | 1 |

940

| PROCESS NAME | PROCESS ID | VERSION NUMBER |
|---|---|---|
| WITHDRAWAL | 0003-0001 | 1 |

| NODE/PROCESS ID | NODE/PROCESS NAME | USER ID (HIERARCHY FLAG) | VERSION NUMBER |
|---|---|---|---|
| 0007-0001 | SLIP EXAMINATION | yagi | 1 |
| 0008-0001 | CONTENTS EXAMINATION | inoue | 1 |
| 0009-0001 | PAYMENT | akiyama | 1 |

960

| PROCESS NAME | PROCESS ID | VERSION NUMBER |
|---|---|---|
| WITHDRAWAL | 0003-0002 | 2 |

| NODE/PROCESS ID | NODE/PROCESS NAME | USER ID (HIERARCHY FLAG) | VERSION NUMBER |
|---|---|---|---|
| 0007-0001 | SLIP EXAMINATION | yagi | 1 |
| 0009-0001 | PAYMENT | akiyama | 1 |

PROCESS MANAGEMENT TABLE

| NODE/ PROCESS ID | NODE/PROCESS NAME | VERSION NUMBER | UTILIZATION PERMISSION FLAG | SUSPENSION FLAG | SUPERVISOR ID |
|---|---|---|---|---|---|
| 0001-0001 | WITHDRAWAL JOB | 1 | 0 | 0 | yamada |
| 0002-0001 | SLIP PREPARATION | 1 | 0 | 1 | sakai |
| 0003-0001 | WITHDRAWAL | 1 | 0 | 0 | nagai |
| ⋮ | ⋮ | ⋮ | ⋮ | ⋮ | ⋮ |

FIG.7

SUSPENDED WORK TABLE

| WORK ID | NODE/PROCESS ID | NODE/PROCESS NAME | VERSION NUMBER |
|---|---|---|---|
| A0001 | 0002-0001 | SLIP PREPARATION | 1 |
|  |  |  |  |
| ⋮ | ⋮ | ⋮ | ⋮ |

FIG.6

PROCESS TABLE

| PROCESS NAME | PROCESS ID | VERSION NUMBER | WORK ID |
|---|---|---|---|
| WITHDRAWAL JOB | 0001-0001 | 1 | A0001 |

| NODE/ PROCESS ID | NODE/PROCESS NAME | USER ID (HIERARCHY FLAG) | VERSION NUMBER | TRACKING FLAG |
|---|---|---|---|---|
| 0002-0001 | SLIP PREPARATION | (NULL) | 1 | -1 |
| 0003-0002 | WITHDRAWAL | (NULL) | 2 | 2 |
| 0004-0001 | CONFIRMATION | ohmura | 1 | 0 |

| PROCESS NAME | PROCESS ID | VERSION NUMBER | WORK ID |
|---|---|---|---|
| SLIP PREPARATION | 0002-0001 | 1 | A0001 |

| NODE/ PROCESS ID | NODE/PROCESS NAME | USER ID (HIERARCHY FLAG) | VERSION NUMBER | TRACKING FLAG |
|---|---|---|---|---|
| 0005-0001 | SLIP ENTRY | ohmura | 1 | -1 |
| 0006-0001 | SLIP CHECK | kobayashi | 1 | -1 |

| PROCESS NAME | PROCESS ID | VERSION NUMBER | WORK ID |
|---|---|---|---|
| WITHDRAWAL | 0003-0002 | 2 | A0001 |

| NODE/ PROCESS ID | NODE/PROCESS NAME | USER ID (HIERARCHY FLAG) | VERSION NUMBER | TRACKING FLAG |
|---|---|---|---|---|
| 0007-0001 | SLIP EXAMINATION | yagi | 1 | 1 |
| 0009-0001 | PAYMENT | akiyama | 1 | 0 |

FLOW CHART "PROCESS DEFINITION AND STORAGE"

FLOW CHART "LIMITATION ON PROCESS UTILIZATION/CANCELLATION OF LIMITATION"

FLOW CHART "OPERATION OF ONE NODE"

FLOW CHART "PROCESS SUSPENSION"

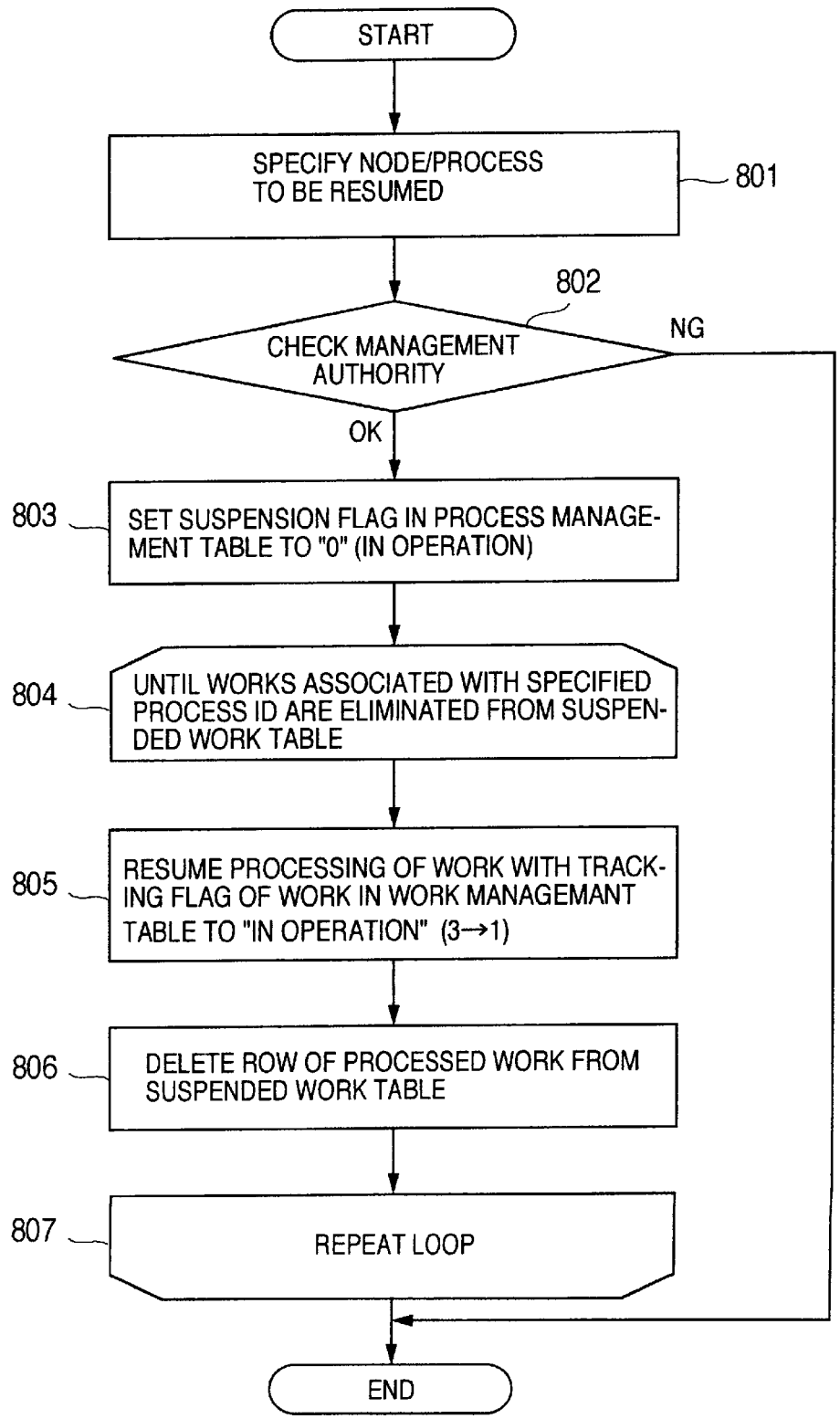

WORKFLOW MANAGEMENT METHOD AND APPARATUS

BACKGROUND OF THE INVENTION

The present invention relates generally to a workflow management system and a document circulation method in a workflow system, and more particularly to a hierarchical workflow management system suitable for changing a circulation route during document circulation, and a workflow document circulation method using same.

D. Hollingsworth, "Workflow Management Coalition The Workflow Reference Model," Nov. 29, 1994, pp. 3–51, discloses a process definition workflow management.

A workflow system, positioned as an information processing system for improving the efficiency of a document circulation job in an office, is a system which produces electronic documents and information and circulates them on a network to improve the job efficiency in a job in which a plurality of humans progress a common business process while communicating such documents and information with each other.

The workflow system allows documents and information to be automatically circulated to a role at the next node through a workflow client by previously storing procedures and rules for jobs or business processes on a workflow server. The circulation order and rules for a job are each called a "process."

In the prior art, when processes, i.e., flows of program control are stored, all definition information for each different process is separately stored in a workflow server connected to a workflow system. In this event, if a process to be newly stored in the server is similar to an existing process, a definition operation for the new process may be facilitated by copying the definition information of the existing process and adding appropriate modifications thereto. Even in this case, however, all definition information is separately preserved on the workflow server for each process. When a stored process is to be modified, a new process is separately stored on the workflow server, and the old process is deleted as required. For storage and modification of these process definitions, a supervisor is assigned to each process and is authorized for such definitions and modifications of the associated process.

When a document is circulated through a workflow, the document is circulated in order from the first viewer on definition. If the circulation is suspended in the midway, in general, all works in course of circulation, including an associated process, are entirely suspended. In some workflow systems, each work may be suspended instead.

The prior art method as mentioned above implies the following problems:

(a) Unlimited Use of Stored Process:

For a request to copy and use an existing process for modifying a stored process or for defining a new process, some of existing processes may have been modified or are defective, so that even if he use of an existing process is to be limited, there is no countermeasures taken therefor. Consequently, the system cannot be adapted to jobs and/or organizations which may be frequently changed.

(b) Modifications to Stored Process:

When a job and/or an organization is modified and associated processes are to be modified correspondingly, all the processes including the modified job and/or organization must be manually handled, thereby requiring complicated and laborious works.

Even if a newly stored process is similar to an existing process, the new process must be stored as a completely different process in a workflow server. Thus, if a number of similar processes exist, the same data, stored the same number of times, will consume a recording area of a computer for nothing. Also, for modifying only a portion of an existing process, the entire process including unmodified portions must be stored again in the workflow server, thereby uselessly consuming a recording area.

(c) Partial Modifications to Process:

Since a supervisor is assigned to each process in the prior art, the supervisor must respond to any request, e.g., even a request to modify an extremely small portion of the process. If minute process modifications in respective organizations are separately requested from respective small divisions in a large scaled process, the management for the requests will be complicated and laborious.

(d) Testing of Stored Process:

When a stored process is tested, a workflow to be tested must be processed in order from the first viewer of the process, even if the test is conducted only for an extremely small portion of the whole process, thus making the test inefficient.

(e) Switching of Process in operation:

As to a workflow in which a modified process has been started (on a previous process) before it is stored in a server, the workflow is processed by the previous process even if the modified process has been stored in the server before the workflow reaches a modified portion of the process. Therefore, newly initiated processes after the modified process has been stored can only be processed by the modified or updated process. At the time the updated process is stored in the server, subsequent workflows must be passed through the new process (in parallel with the older process).

(f) Partial Suspension of Process in Operation:

Assume that circulation of a document to predetermined employees should be reserved for reasons of secrecy or the like, for example, in the case of a document including secret items such as modifications to the company's organization, information on new products, and so on. In this situation, if each process is suspended in each workflow, when a plurality of workflows are flowing through a plurality of processes, these processes must be suspended one by one. In addition, newly initiated workflows must be constantly monitored, thus causing a problem related to the efficiency. Further, when a process is suspended, an associated job will also be suspended even in portions other than the suspended portion, thus causing a delay in processing. If a process is to be suspended immediately before a location to be suspended, a supervisor must monitor the process for appropriately performing the suspension.

SUMMARY OF THE INVENTION

It is a first object of the present invention to provide a workflow management method which is efficient in modifications and maintenance for existing processes.

It is a second object of the present invention to provide a workflow management method which is capable of reducing time and labor required to define a similar process and saving a disk area in a workflow server.

It is a third object of the present invention to provide a workflow management method which efficiently realizes limitation on excessive use of existing processes for defining a new process.

It is a fourth object of the present invention to provide a workflow document circulation method which is capable of flexibly adapting each work to modifications to a process in operation to which the work is passed.

It is a fifth object of the present invention to provide a workflow document circulation method which is capable of efficiently realizing suspension of circulation to certain viewers without affecting other viewers.

It is a sixth object of the present invention to provide a workflow document circulation method which is capable of starting work circulation from the middle of a process as a test for debugging.

A workflow management method according to the present invention includes the steps of:

storing in a table a plurality of definition information sets for individually defining workflows for a plurality of processes included in a job for processing a plurality of works to be circulated, wherein the plurality of definition information sets each have a process ID, a process name, and a user role ID, and at least one of the plurality of definition information set has predetermined data for connecting processing defined by another definition information set in the user role ID; and storing in a table a work management information set created for each of the plurality of works subjected to processing by the job, the work management information set having a process ID, a process name, a user role ID, and a flag representative of whether or not workflow processing corresponding to processing of each work has been terminated.

The user role ID includes either a name of a user permitted to access the workflow system for processing one workflow or a first predetermined code indicating hat the workflow processing is defined in another definition information set.

After copying and updating one of the plurality of stored definition information sets, the one definition information set can be stored in the table. A process management information set having a utilization permission flag indicative of whether or not the plurality of definition information sets, stored in the table, may be copied can be stored in a process management table.

As described above, the present invention takes advantages of features including hierarchical storage of processes, addition of process use limit information, hierarchical management of processes, hierarchical modifications to the processes, and hierarchical suspension of processes. As a result, when a process is modified due to a change in job or in organization, a portion (also called a "subprocess" or a "process") requiring modifications may only be modified. Since the modification is reflected to all processes defined in combination with the modified subprocess, the supervisor is required to attend to the modifications only once, thus improving the efficiency in maintaining the system. Subprocesses not related to the modification may be utilized as a black box. Also, when a similar process or a partially modified existing process is stored, unmodified subprocesses may be shard by other processes, so that a recording area in the workflow server can be saved.

When a document is to be initiated in the middle of a process for the purpose of testing or the like, subprocesses constituting portions to be tested may be combined to form a new process which is then stored for testing. In this way, it is not necessary to pass the document through the whole process from the beginning, so that an efficient testing can be performed.

When information related to utilization limitation is added to each stored subprocess, a development engineer may check this information when he combines stored subprocesses for defining a new process. In this way, utilization of a subprocess can be prohibited or limited through the utilization limitation information if utilization of the subprocess should be limited when another person defines a new process, for example, if the subprocess is likely to be defective or if an organization associated with the subprocess is to be changed shortly.

When a workflow supervisor is assigned to each subprocess and authorized for modification, suspension, and so on related to the subprocess, a global supervisor does not have to be involved in each of partial modifications in organization even in a large scale process related to a large number of departments of the organization. Instead, subprocess supervisors may be dedicated to their respective subprocesses to realize an efficient and careful workflow management.

When a work flows on the workflow system, a work management table may be provided for each work to record the order in which the work flows, Information on the progress of the work, and so on. Each time the work transitions among subprocesses constituting the process, order information for a subprocess to which the work will next transition is recorded in this work management table.

In this way, even if any modification is added to a subprocess in a workflow in operation, provided that an already started work has not yet transitioned to the modified subprocess, the work can transition to the modified or updated subprocess by selecting information on the modified subprocess when subprocess information is fetched. In addition, it is also possible to force a work to transition to a plurality of subprocesses as they are selected.

It is also possible to add an information item related to a suspended operation for each subprocess. When the operations of subprocesses are to be individually suspended, this operation suspension information may be changed by inputting information from a terminal. This information is referenced when a work transitions to an associated subprocess. If the subprocess is instructed to suspend, work information is recorded in a separate table. When this subprocess is resumed at a later time by an instruction inputted through a terminal, the operation suspension information in the subprocess is changed, and works associated with this subprocess are retrieved from a suspended work information table and resumed.

In this way, even if circulation of a document is to be reserved to predetermined employees, associated subprocesses may be suspended to achieve such limited circulation, instead of suspending the whole workflow to cause possible stagnation of jobs executed by other employees who are not prohibited from reading the document. In addition, the suspension processing can be performed on each subprocess basis without the need to suspend each work or to monitor initiation of a new work for conducting the suspension processing. Since the suspended subprocess is collectively reflected to all workflows which use the subprocess in combination with other subprocesses, the supervisor can efficiently realize partial suspension of a workflow.

BRIEF DESCRIPTION OF THE DRAWINGS

FIG. 2 is a flow diagram illustrating an example of workflow definition for a withdrawal job;

FIGS. 3A–3C are flow diagrams illustrating an exemplary hierarchical representation of the withdrawal job of FIG. 2, where the workflow is divided into subprocesses;

FIG. 4 is a diagram illustrating an exemplary structure of a process table for storing information on each subprocess;

FIG. 5 is a diagram illustrating an exemplary structure of a process management table for storing management information on a whole subprocess;

FIG. 6 is a diagram illustrating an exemplary structure of a workflow management table for storing a circulation route, progress information, and so on for each workflow which is circulated in the workflow system;

FIG. 7 is a diagram illustrating an exemplary structure of a suspended work table for storing information on works waiting for resumption for suspended subprocesses;

FIG. 12 is a flow chart illustrating an embodiment of a processing procedure for resuming a suspended subprocess in FIG. 10.

DESCRIPTION OF THE PREFERRED EMBODIMENTS

One embodiment of the present Invention will hereinafter be descried in detail with reference to the accompanying drawings. It will be understood that while the following embodiment is described in connection with an example in which the present invention is applied to a withdrawal job, the present invention is applicable to other embodiments in any form as long as they do not depart from the scope of the present invention as set forth in the appended claims.

Figure 1:
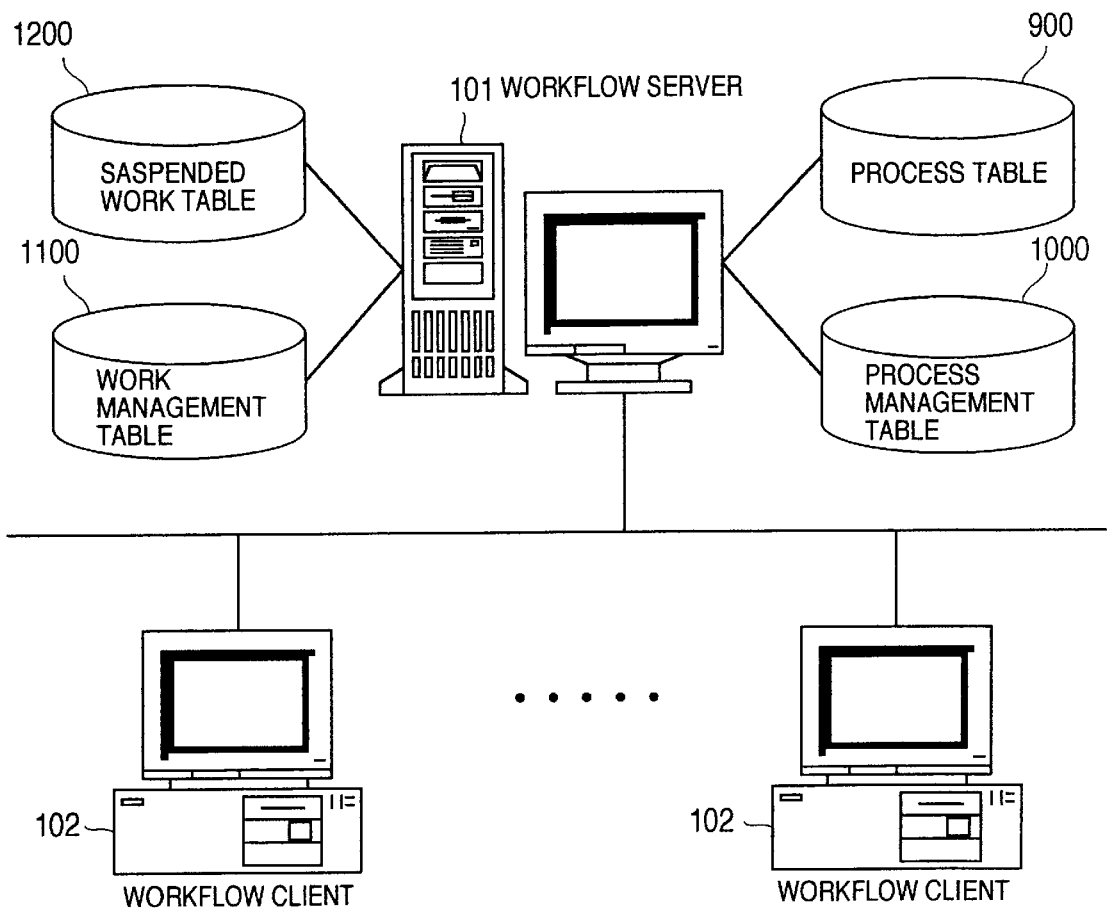
FIG. 1 is a block diagram illustrating the relationship between a server and clients and tables in a workflow system according to the present invention.

FIG. 1 is a block diagram illustrating an exemplary configuration of workflow clients and a workflow server as well as a storage unit for storing a variety of tables according to the present invention. In FIG. 1, the workflow server 101 and the respective workflow clients 102 are generally connected to each other through a network. The workflow server 101 stores information on each stored workflow in a process table 900, and management information on each workflow in a process management table 1000. When a workflow is started in a workflow client 102, the workflow server 101 creates a work management table 1100 from the process table 900 and the process management table 1000, and stores therein information for managing each work (such as progress information). Also, when input information from the workflow client 102 instructs to suspend the workflow, the workflow server 101 creates a suspended work table 1200 from the work management table 1100 to manage suspended works.

Here, a hierarchical definition for a workflow or a process of the present invention will be described in connection with a withdrawal job taken as an example with reference to FIGS. 2 and 3.

FIG. 2 illustrates an example of a workflow (process) for a withdrawal job. First, a requester 211 fills out a withdrawal slip for requesting a withdrawal (201). The requester 211 collectively represents requesters dedicated to the process, and "ohmura" 212 is a network address of an actual person in charge. By specifying this address, information can be uniquely transmitted to the destination. The filled slip is checked by a boss of the requester (202), and then passed to an accountants' section for examination by an accountant in charge (203). A cashier in charge performs the payment in accordance with the slip approved as a result of the examination (204). Finally, the requester confirms the amount of withdrawn money (205), followed by the completion of the withdrawal. Each of job units from 201 to 205 is hereinafter called a "node."

When the withdrawal job process of FIG. 2 is regrouped, for example, in accordance with sections of the organization, the process may be divided into three parts as illustrated in a flow diagram of FIG. 3. More specifically, the withdrawal job process is divided into a slip preparation 301, a withdrawal 302 in the accountants department, and a confirmation 303 by the requester. The slip preparation 301 is defined by a more detailed workflow 310. Specifically, the slip preparation 301 is composed of slip entry by the requester 311 and slip check by the boss 312. Similarly, the withdrawal 302 is defined by a workflow 320 composed of slip examination by an accountant in charge 321 and payment by a cashier in charge 322. The withdrawal 300 indicative of the whole process is defined by a workflow composed of the slip preparation 301 in a requesting section, the withdrawal 302 in the accountants' department, and the confirmation by the requester 303. In this way, the withdrawal job can be hierarchically divided into three workflows by regrouping the withdrawal job in terms of the organization and the contents. Each of the three workflows is called a "subprocess." In the following, a workflow is treated as a synonym of the subprocess unless otherwise specified, so that the workflow is simply used when there is no possibility of confusion, while the subprocess is used when particular attentions should be drawn.

Next, a variety of tables held in the workflow server will be described with reference to FIGS. 4–7.

FIG. 4 illustrates an exemplary structure of the process table 900 for storing a definition information set for each subprocess. One process table 900 is composed of a process name 901, an ID 902 for uniquely identifying an associated process, an identification number 903 for modification or version-up of the process, and a table (node information table) 910 for storing information on nodes constituting the process. The node information table 910 stores information on respective nodes from the top of the table in the order of executing associated jobs. Each node information includes a node/process ID 911 indicative of an identification number of an associated node (or a process when the node is described in greater detail as subprocesses); a node/process name 912 of the node process; a network ID (address) 913 of a person in charge (user) who processes the node; and a version number 914 of the node. When a node is composed of more detailed nodes as subprocesses, a NULL value is stored in the user ID 913 (or nothing is stored therein). Also, when the version of a constituent node is not particularly specified, "0" is stored in the version number 914 of the constituent node. When a plurality of users access the system, the names of these users have been previously defined in a role ID table (not shown), and a code for referencing the role ID is set in the user ID 913 of each of the users.

Process tables 900, 920, 940, 960 are created for respective subprocesses. The example illustrated in FIG. 4 corresponds to the three subprocesses 300, 310, 320 in FIG. 3. FIG. 4 illustrates, however, that there are two process tables, the process name of which is withdrawal processing, i.e., one 940 with the version number set at "1" and the other 960 with version number set at "2" which is copied from the process table 940.

FIG. 5 illustrates an exemplary structure of the process management table 1000 for storing management information for managing a plurality of subprocesses constituting a single process. The process management table 1000 is composed of an identification number 1001 of a subprocess; a name 1002 of the subprocess; a version identification number 1003; a utilization permission flag 1004 indicative of permission information as to whether an associated subprocess may be copied and used as a node of another subprocess; a suspension flag 1005 indicative of suspension instruction information for suspending the subprocess; and a supervisor ID 1006 indicative of a network address of a supervisor of the subprocess. The utilization permission flag 1004 indicates that an associated subprocess may be utilized when it is set at "0"; and that the utilization of the associated subprocess is limited when set at "1." The suspension flag 1005 indicates that an associated subprocess is in operation when it is set at "0" and that the associated subprocess is suspended when set at "1."

FIG. 6 illustrates an exemplary structure of the work management table 1100. The work management table 1100 is created for each work to be circulated in the system and provides a table for recording an order in which the work flows, progress information on the work, and so on. In FIG. 6, one work management table 1100 comprises an information set 1110 related to each of subprocesses constituting a workflow associated with a work. Each information set 1110 is composed of a subprocess name 1111; a process ID 1112; a version number 1113; a work ID 1114 indicative of the identification number for a work; and a table 1120 for indicating information on nodes constituting a subprocess. The table 1120 for indicating information on constituent nodes (node information table) is composed of an ID of each node 1121; a node name 1122; a network address ID 1123 of a supervisor (user) assigned to process an associated node; a version number of the node 1124; and a tracking flag 1125 indicating at which node an associated work is being currently processed. Here, the tracking flag 1125 indicates that the work has not reached the node when set at "0"; the work is being processed at the node when set at "1"; the work has passed the node when set at "−1"; the work exists in one of subprocesses (a lower layer) of the node when set at "2"; and the work is suspended at the node when set at "3."

The work management table 1100 in FIG. 6 corresponds to the workflows in FIGS. 2 and 3, and indicates that the work is being processed in slip examination (by an accountant in charge named "yagi") in the withdrawal.

FIG. 7 illustrates an exemplary structure of the suspended work management table 1200. The suspended work management table 1200 is a table used, when the suspension flag 1005 in FIG. 5 is set so that a work cannot be transitioned to a next node due to suspension of a workflow, for temporarily storing information on the work until the workflow is resumed. In FIG. 7, the suspended work table 1200 includes an ID 1201 of the work; a node/process ID 1202 of a suspended node; a name 1203 of the suspended node; and a version number 1204 of the node, all of which are set for each suspended work. These items are erased from the table 1200 when the node is resumed.

Next, the operation of the system according to the present invention illustrated in FIG. 1 will be described with reference to flow charts of FIGS. 8–12.

Figure 8:
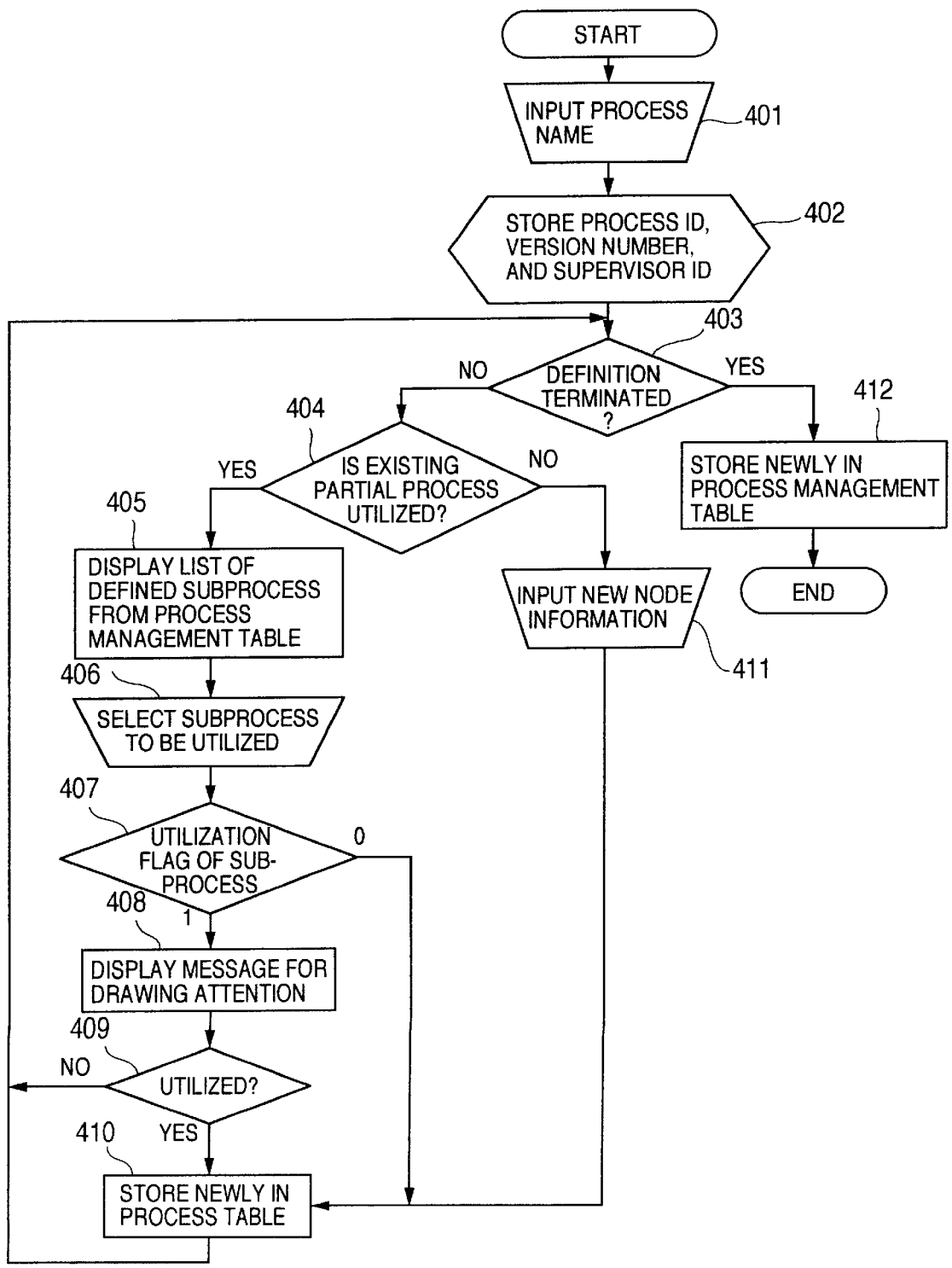
FIG. 8 is a flow chart illustrating an embodiment of a processing procedure for defining a workflow in the present invention.

FIG. 8 is a flow chart illustrating an embodiment of a processing procedure for defining a workflow in the present invention.

A development engineer may input a process name of a subprocess which he desires to define from a terminal (step 401). A workflow server 101 issues a process ID for this process name so as not to use the same process ID of a previously stored workflow. In this event, if a subprocess having the same process name has already been stored in the server, its version number is set to the largest possible value as the version number plus one. The workflow server 101 newly stores a process table 900 with the issued process ID, the set version number, and the network ID of the development engineer as the supervisor ID (step 402).

The development engineer repeats the following processing until the workflow definition is terminated, and sends an instruction to terminate the process definition to the workflow server 101 when the definition is terminated, thus terminating the processing for defining the workflow (step 403).

It is first determined whether a subprocess previously stored in the workflow server 101 is copied and utilized in the definition of a new workflow (step 404). When no existing process is utilized, the development engineer inputs the name of a node, a version number, and the network address of a user in charge (step 411), and the workflow server 101 stores the inputted information in the process table 900 created at step 402 (step 410). In this event, the workflow server 101 assigns an node ID to the inputted node name and version number such that the assigned node ID is not identical to any of previously stored node IDs, and also stores the assigned node ID. When the node has been stored, the processing procedure returns to step 403, where selection is made as to whether a next node is stored or the definition of the process is terminated.

When a previously stored subprocess is utilized at step 404, the workflow server 101 displays subprocesses so far stored in the process management table 1000 in the form of list (step 405), to allow the development engineer to select a subprocess to be utilized from the list (step 406). The workflow server 101 determines from the process ID of a subprocess selected by the development engineer the value of the utilization permission flag of the subprocess in the process management table 1000 (step 407). If the value of the utilization permission flag is "0," the utilization of this subprocess is permitted, so that the ID, the name, and the version number of the subprocess is acquired from the process management table 1000, and stored in the process table 900 created at step 402 (step 410). In this event, for indicating that the subprocess is defined by more detailed nodes, a NULL value is stored n the user ID (hierarchy flag).

On the other hand, if the utilization permission flag of the subprocess is "1" at step 407, the utilization of this subprocess is limited or prohibited, so that the workflow server 101 displays a message for drawing attention of the development engineer (step 408). The development engineer reading the message determines whether or not the subprocess should be still utilized (step 409). If the development engineer determines to utilize the subprocess, process information on the subprocess is stored in the process table 900 at step 410 in a manner similar to the foregoing. If the development engineer determines to give up the utilization of the subprocess, the procedure returns to step 403 to continue the process definition without storing information on the selected subprocess.

For terminating the processing for defining the workflow at step 403, the ID, the name, and the version number of the subprocess newly stored in the process table 900 are added to the process management table 1000, and the network address of the development engineer is stored as a supervisor ID (step 412). In this event, "0" is stored in the utilization permission flag and the suspension flag, respectively.

Figure 9:
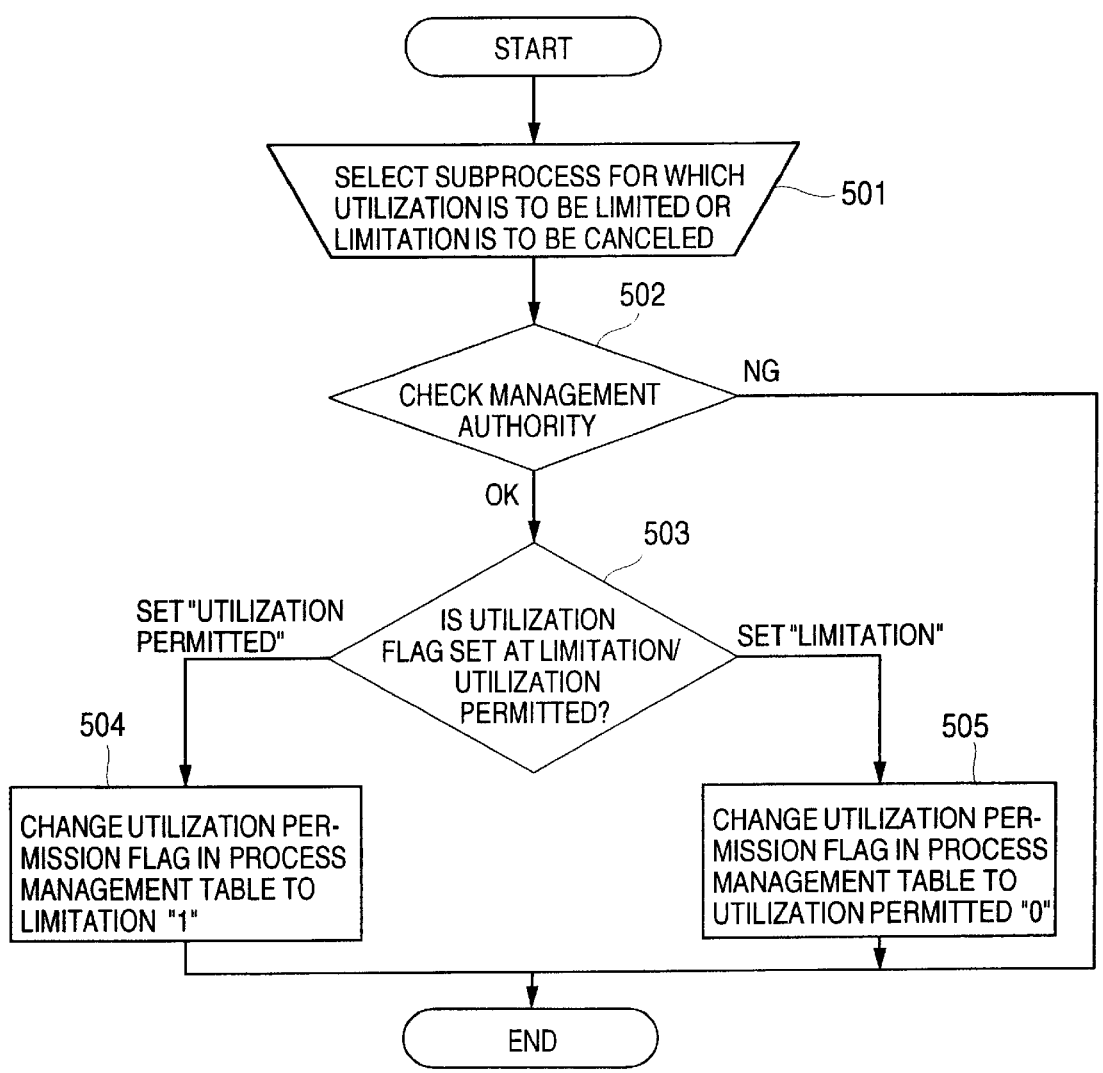
FIG. 9 is a flow chart illustrating an embodiment of a processing procedure for limiting utilization of a subprocess and canceling limitation in FIG. 8.

FIG. 9 is a flow chart illustrating an embodiment of a processing procedure for changing the utilization permission flag (i.e., for setting limitation on utilization or cancellation of limitation) in the process management table 1000 which has been referenced at step 407 in FIG. 8.

First, a user, who desires to limit (or cancel limitation on) the utilization of a subprocess, inputs the ID of the subprocess and requests the workflow server 101 to change the utilization permission flag (step 501). The workflow server 101 retrieves the supervisor ID 1006 of the subprocess from the process management table 1000 based on the process ID of the subprocess to which the change has been requested, and checks whether the supervisor ID 1006 of the subprocess matches the network address of the user requesting the change (step 502). If no match occurs, the processing is terminated without giving permission to the user to change the utilization permission flag in order to limit selfish utilization of the subprocess (or cancel limitation on the subprocess). On the other hand, if a match occurs, it is determined whether the utilization of the subprocess is to be limited or the limitation on utilization is canceled (step 503). Then, the value of the utilization permission flag stored in the process management table 1000 is changed to "1" (utilization limited) if it has been set at "0" (utilization permitted), or to "0" (utilization permitted) if it has been set at "1" (utilization limited) (step 505).

Figure 10:
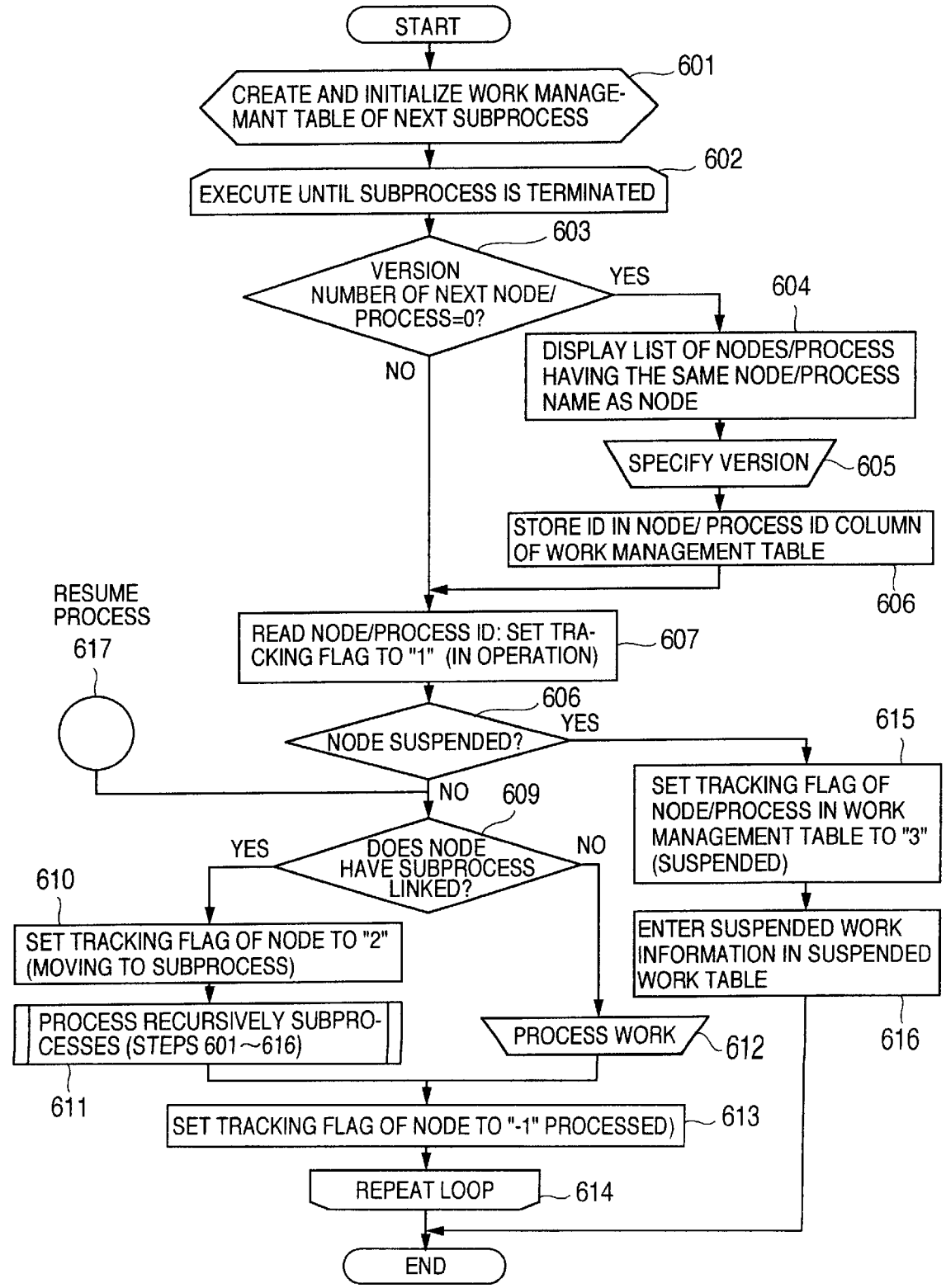
FIG. 10 is a flow chart illustrating an embodiment of a processing procedure for operating a workflow in the present invention.

FIG. 10 is a flow chart illustrating an embodiment of a processing flow for operating a workflow in the present invention. In the following, processing for actually passing a work (document) through a workflow defined as illustrated in FIGS. 4 and 5 will be described with reference to a flow chart of FIG. 10.

First, when the user newly initiates a work by specifying a workflow from a workflow client 102, the workflow server 101 retrieves information on a subprocess from the process table 900 (in this case, the first subprocess specified) to which the work next transitions, based on the workflow ID, and creates a work management table 1100 (FIG. 6) for this work from the process name 901, the process ID 902, the version number 903, and the constituent node information table 910 of the subprocess (step 601). In this event, a work ID 1114 is assigned to the work so as to be different from any of so far assigned work IDs, and is also stored in the work management table 1100. In addition, an item 1125 for storing a tracking flag is added to each node in the node information table 1120, and "0" is stored in the tracking flag. As previously described with reference to FIG. 6, the tracking flag 1125 is a value indicative of a current progress situation of the work in the workflow. If the tracking flag 1125 of a certain node is "0," this means that the work has not reached the node. The tracking flag 1125 indicates that the work is being currently processed at the node when set at "1"; the work has passed the node when set at "−1"; the work exists in one of subprocesses (a lower layer) of the node when set at "2"; and the work is suspended at the node when set at "3."

For each of the nodes constituting the subprocess, the following processing is performed until the partial processing is terminated (step 602).

The workflow server 101 acquires the value of the version number of the next node in the subprocess (in this case, since the subprocess has just started, the next node refers to the first node). The value of the version number is a code for uniquely specifying the version of a subprocess if a plurality of versions exists in the subprocess due to difference in organization, modifications, and so on. The version is numbered, for example, in a defined order from "1." Then, the version number is also specified together with the process name when a workflow is defined to identify a subprocess to be utilized. Here, if a subprocess has been updated, it is thought that the user desires to always process a work with the latest version of the subprocess. For such a case, "0" is specified as the version number, and a NULL value is specified as the node ID during the workflow definition, such that if the version number "0" is detected when a work is actually passed, the latest version of the subprocess may be utilized at that time. In this way, the work can be processed with the latest version of the subprocess.

The workflow server 101 determines the acquired version number (step 603). If the value of the version number is other than "0," a particular version is specified for the subprocess, so that the node ID is acquired, and the tracking flag of the associated node in the node information table 1120 in the work management table 1100 is changed to "1" (under processing), assuming that the processing has transitioned to the node (step 607). On the other hand, if the value of the version number for the next node is "0" (not reached) at step 603, the workflow server 101 retrieves nodes having the same name as the name of the node from the process management table 1000, and displays the retrieved nodes in the form of list (step 604). The user specifies a version to which the user desires the work to transition from the list (step 605). The workflow server 101 retrieves the node of the specified version number from the process management table 1000, and stores the version number and the node ID in respective items for the node in the node information table 1120 of the work management table 1100 (step 606). Since the version can now be specified, the node ID is acquired in a manner similar to the processing with the version number being other than "0," and the tracking flag is set to "1" (under processing) (step 607).

Next, the workflow server 101 searches the process management table 1000 for the suspension flag 1005 of the node based on the acquired node ID, acquires the value of the suspension flag 1005, and branches the processing in accordance with the value of the suspension flag 1005 (step 608). The suspension flag 1005 is a code indicating whether or not the node (process) is currently suspended or in operation. Specifically, the suspends on flag 1005 set at "0" indicates that the node is in operation, while the suspension flag 1005 set at "1" indicates that the node is suspended.

When the suspension flag is "0" (in operation), the workflow server 101 determines whether or not the node includes subprocesses from the user ID (hierarchy flag) 1123 of the node in the node information table 1120 of the work management table 1100 (step 609). If any other data than the NULL value is stored as the user ID (hierarchy flag) 1113, this data indicates the network address of an operator of the node. In this case, the workflow server 101 transmits the work to the operator, so that the operator performs processing in accordance with the contents of the work (step 612). On the other hand, if the NULL value has been stored in the user ID (hierarchy flag) 1113 at step 609, this means that the node is defined by more detailed nodes as subprocesses. For example, the slip preparation node 301 is represented by the more detailed definition (subprocess) 310. In the work management table 1100 of FIG. 6, this relationship between the slip preparation node 301 and the subprocess 310 is corresponded by setting the NULL value to the user ID (hierarchy flag) of the node name "slip preparation" in the node information table 1120. When the user ID of the node indicates the NULL value, the workflow server 101 changes the tracking flag 1125 of the node to "2" (moving to subprocess) in order to pass the work to a subprocess (next subprocess) (step 610). Then, the workflow server 101 retrieves nodes indicated by the node ID 1121 of the node from the process management table 1000, and recursively executes the work operation processing from step 601 to step 616 as the next subprocess (step 611).

When the processing for the work is terminated by paying a requested amount of money or the like at step 612, or when the processing for a subprocess at a lower hierarchical level is completed at step 611, the node has been completely processed, so that the tracking flag 1125 of the node in the node information table 1120 of the work management table 1100 is changed to "−1" (processed) (step 613). Then, the processing is passed to the next node in the node information table 1120 on the work management table 1100, and the processing from step 603 to step 613 is repeated until the tracking flags 1125 of the nodes constituting the subprocess are all set to "−1" (processed) (step 614). The work management table 1100 of FIG. 6 shows that the constituent nodes 311, 312 of the subprocess 310 representing slip preparation in FIG. 3 have been completely processed, and that the constituent node 321 (examination of slip) of the subprocess 320 representing the next withdrawal is under processing.

At step 608, when the suspension flag 1005 of the node in the node information table 1120 of the work management table 1100 is "1" (suspended), the work cannot be passed to a subprocess indicated by the node ID 1121, so that the work must be suspended as well. In this event, the workflow server 101 sets the tracking flag 1125 of the node in the node information table 1120 of the work management table 1100 to "3" (suspended) (step 615). Then, the workflow server 101 stores the ID of the suspended work, and the ID, the name and the version number of the suspended node in the suspended work table 1200 (FIG. 7), and suspends the processing for the work (step 616).

Next, processing for suspending and resuming a subprocess will be described in detail with reference to flow charts of FIGS. 11 and 12.

Figure 11:
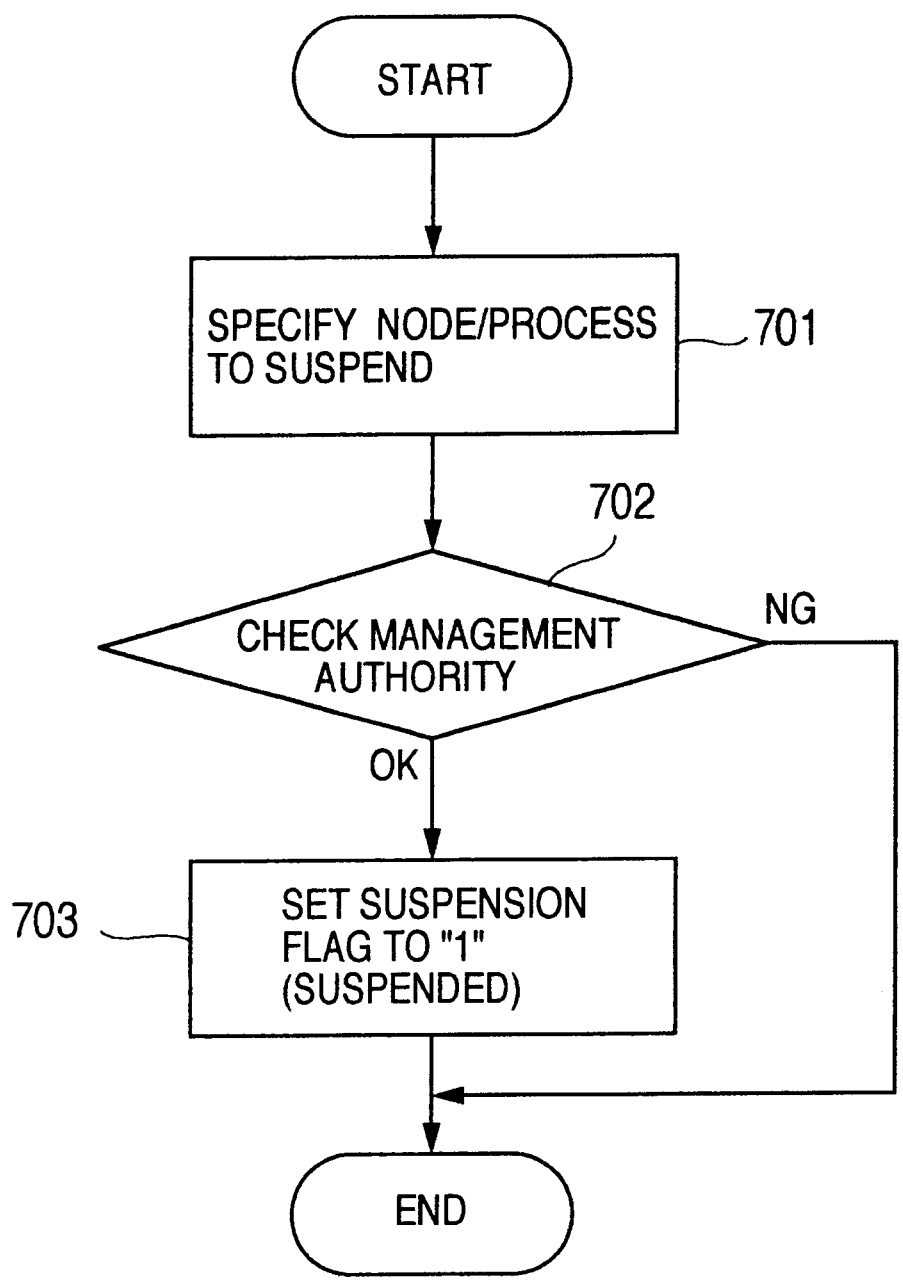
FIG. 11 is a flow chart illustrating an embodiment of a processing procedure for suspending a subprocess in FIG. 10.

FIG. 11 illustrates a processing procedure for suspending a subprocess. When a subprocess is to be suspended, an assigned supervisor first inputs the node/process ID of the subprocess which the supervisor desires to suspend (step 701). The workflow server 101 retrieves the network address of the supervisor requesting the suspension from the process management table 1000, based on the specified node/process ID, and checks whether the network address matches the supervisor ID 1006 of the node (step 702). If the result of the check indicates that the network address of the suspension requesting supervisor matches the supervisor ID, the workflow server 101 regards that the supervisor has authority to suspend the subprocess, and changes the suspension flag 1005 of the node in the process management table 1000 to "1" (suspended) (step 703). If the network address does not match the supervisor ID, the workflow server 101 rejects the suspension of the subprocess in order to avoid indiscriminate abuse of the subprocess suspension, and terminates the processing.

FIG. 12 illustrates a processing procedure for resuming a suspended subprocess. When the operation of a suspended subprocess is to be resumed, an assigned supervisor first inputs the node/process ID of a subprocess the supervisor desires to resume (step 801). The workflow server 101 retrieves the network address of the supervisor requesting the resumption from the process management table 1000, based on the specified node/process ID, and checks whether the network address matches the supervisor ID 1006 of the node (step 802). If the result of the check indicates that the network address of the resumption requesting supervisor matches the supervisor ID, the workflow server 101 regards that the supervisor has authority to resume the subprocess, and changes the suspension flag 1005 in the node in the process management table 1000 to "0" (in operation) (step 803). Subsequently, a work suspended from suspension to resumption of a subprocess is restarted in the following manner.

Works having a subprocess ID of a subprocess to be resumed are retrieved from the suspended work table 1200, and the following processing is performed on all of retrieved works (step 804). Based on a work ID and a node/process ID of a retrieved work, the work management table 1100 associated with the work is searched for a node having the tracking flag 1125 set at "3" (suspended) from nodes indicated by the node/process IDs 1121 in the node information table 1120 of the work management table 1100. Since the work is currently suspended at this node, the tracking flag 1125 of this node is changed to "1" (in operation), and the processing for the work is started (step 805). The resumed work is restarted immediately before step 609 in FIG. 10 at which a check is made as to whether or not the node includes subprocesses (step 617 in FIG. 10). After the work has been resumed, the items associated with the resumed work are deleted from the suspended work table 1200 (step 806). The processing at steps 805, 806 is repeated until works having node ID of nodes to be resumed are eliminated from the suspended work table 1200 (step 807).

One embodiment of the present invention has been described above. In the foregoing embodiment, when a request is made to suspend, resume, or modify a subprocess, a network address of the processing requester is compared with the supervisor ID of the subprocess, and the processing is permitted only when they are coincident. In this way, a supervisor can be assigned to each subprocess, and a hierarchical management can be realized for a workflow. For example, assume in the workflow illustrated in FIG. 3 that the process is modified such that a slip with the amount of money exceeding 200,000 yens, if found during a check of the slip in a requesting section, is circulated also to a boss. If a supervisor responsible for the management of the whole withdrawal job were to handle all associated processing, the supervisor would spend a significant portion of time for the modification similar modification were made in respective departments. In this case, the management associated with modification, suspension, and resumption of a process in a requesting department may all be assigned to a supervisor of the slip preparation subprocess, so that the former supervisor may only be involved in management in the withdrawal partial processing. In this way, it is possible to realize an efficient management suitable for hierarchical subprocesses.

Also, in a workflow defined by a development engineer, if a work is to be initiated in the middle of the workflow for purposes of testing before operation, a workflow may be newly defined in combination with only subprocesses which are to be tested. With the newly defined workflow, the work can be passed only through portions of the original workflow through which the work should transition. For the definition of a workflow composed of subprocesses to be tested, the user may specify a combination of subprocesses from a terminal. Alternatively, the server may automatically create a work management table from information on subprocesses which are specified by the user as subprocesses that the user desires to pass the work through.

In the foregoing embodiment, it is determined whether the supervisor ID of a subprocess matches the network address of a development engineer because a person in charge of development of the subprocess is authorized for an access to a workflow including the subprocess. Thus, the development engineer's ID and the supervisor's ID may be separately specified such that the development engineer and the supervisor are individually stored.

At step 407 in the flow chart of FIG. 8 illustrating the processing procedure for workflow definition, when the utilization of a subprocess is limited, the server displays a message stating that the utilization of the subprocess is limited, such that a development engineer is entrusted to make the final decision. This is intended not to limit the utilization of stored subprocesses by the development engineer. Therefore, a subprocess, when it is limited in its utilization, may be automatically prohibited from being utilized.

Also, at steps 501, 701 in the flow chart of FIG. 9 and at step 801 in the flow chart of FIG. 12, for limiting utilization of a subprocess, canceling limitation on a subprocess, and suspending and resuming a subprocess, the user inputs the ID of the subprocess. Alternatively, the workflow server may extract works of interest from the process management table and displays a list of extracted works on the screen so as to allow the user to select any from the list. In this way, user's input operation may be alleviated.

As described above, according to the present invention, since information on definition of a workflow is divided and stored such that the divided and stored information may be shared and utilized by a plurality of workflows, a storage area of a computer (workflow server) can be saved. Also, when a workflow is modified, subprocesses to be modified may only be modified. Since the modification is reflected to all workflows which utilize the modified subprocesses, an efficient maintenance can be accomplished. Further, when a work is initiated in the middle of a workflow, this can be easily carried out by combining subprocesses in a range in which the work is to be passed. Furthermore, when each subprocess is additionally provided with information for inhibiting a subprocess from being used for defining another workflow, selfish abuse can be prevented.

During operation of a workflow, information on a route through which a table for managing the progress of a work is circulated is stored in a server simultaneously with the progress of the work, so that the workflow system can flexibly support modifications to subprocesses. Also, since information on suspension is added for each subprocess such that the information is referenced simultaneously with the progress of a work, partial suspension of a process is realized, thus eliminating the need to perform suspension operation for each work. Further, if a suspension instruction is issued to a certain subprocess, the suspension can be reflected to a whole workflow utilizing the subprocess, so that the supervisor can efficiently realize the suspension only For a portion of the workflow. Furthermore, since a supervisor is assigned to each subprocess and is authorized to modify and suspend the subprocess, an efficient and careful management can be realized even in a huge workflow to which a large number of departments are related.

What is claimed is:

1. A workflow management method in a workflow system, comprising the steps of:

dividing a workflow into a plurality of processes;

storing in a table a plurality of definition information sets for individually defining workflows for said plurality of processes included in a job for processing a plurality of works to be circulated, wherein said plurality of definition information sets each have a process ID, a process name, and a user role ID, and at least one of said plurality of definition information set has predetermined data for connecting processing defined by another definition information set in said user role ID; and storing in a table a work management information set created for each of said plurality of works subjected to processing by said job, said work management information set having a process ID, a process name, a user role ID, and a flag representative of whether or not workflow processing corresponding to processing of each work has been terminated.

2. A workflow management method according to claim 1, wherein said user role ID includes either a name of a user permitted to access said workflow system for processing one workflow or a first predetermined code indicating that said workflow processing is defined in another definition information set.

3. A workflow management method according to claim 2, wherein said process ID includes a process ID indicative of the location of said other definition information set when said user role ID includes said first predetermined code indicating that said workflow processing is defined in said other definition information set.

4. A workflow management method according to claim 3, wherein said process ID includes a second predetermined code indicative of existence of a plurality of other definition information sets when a plurality of other definition information sets exist.

5. A workflow management method according to claim 4, wherein when said plurality of other definition information sets exist, one of said other definition information sets selected by a process name in a predetermined way is employed.

6. A workflow management method according to claim 1, further comprising the step of:

after copying and updating one of said plurality of stored definition information sets, storing said one definition information set as an updated definition information set in said table, wherein said updated definition information sets each have a process ID, a process name, and a user role ID, said process ID being different from the process ID of said one definition information set.

7. A workflow management method according to claim 6, further comprising the step of:

when the process name of said one definition information set is the same as the process name of said updated definition information set, employing either one of the definition information sets selected by a predetermined method.

8. A workflow management method according to claim 7, further comprising the step of:

storing in a process management table a process management information set having a utilization permission flag indicative of whether or not each of said plurality of definition information sets stored in said table may be copied.

9. A workflow management method according to claim 6, wherein said updated definition information set has a set of a new process ID, a new process name, and a new user role ID.

10. A workflow management method according to claim 1, further comprising the step of:

storing in a table a suspended work information set including an ID of one of said plurality of works to be circulated, and a workflow ID indicative of a workflow in which said one work should be suspended.

11. A workflow management method according to claim 10, wherein circulation of said one suspended work is resumed in accordance with input information from a terminal connected to said system.

12. A storage unit in a workflow server for workflow management comprising:

a plurality of tables for storing definition information sets for individually defining workflows for a plurality of processes included in a job for processing a plurality of works to be circulated, wherein said plurality of definition information sets each have a process ID, a process name, and a user role ID, and at least one of said plurality of definition information set has predetermined data for connecting processing defined by another definition information set in said user role ID; and a table for storing a work management information set created for each of said plurality of works subjected to processing by said job, said table having a process ID, a process name, a user role ID, and a flag representative of whether or not workflow processing corresponding to processing of each work has been terminated.

13. A storage unit according to claim 12, wherein said user role ID includes either a name of a user permitted to access said workflow system for processing one workflow or a first predetermined code indicating that said workflow processing is defined in another definition information set.

14. A storage according to claim 12, further comprising;

a table for storing a process management information set having a utilization permission flag indicative of whether or not each of said plurality of definition information sets may be copied.

15. A storage unit according to claim 12, further comprising:

a able for storing a suspended work information set including an ID of one of said plurality of works to be circulated, and a workflow ID indicative of a workflow in which said one work should be suspended.

16. A workflow management system comprising:

a workflow server;

a storage unit connected to said workflow server for inputting a workflow divided into a plurality of processes, and storing in a table a plurality of definition information sets each defining respective workflows for said plurality of processes included in a job for processing a plurality of works circulated in said system, wherein said plurality of definition information sets each has a process ID, a process name, and a user role ID and at least one of said plurality of definition information sets has predetermined data for connecting processing defined by another definition information set in said user role ID, wherein said storage unit further stores in a table a work management information set created for each of said plurality of works subjected to processing by said job, said work management information set having a process ID, a process name, a user role ID, and a flag representative of whether or not workflow processing corresponding to processing of each work has been terminated.

17. A workflow management system according to claim 16, wherein said user role ID includes either a name of a user permitted to access said workflow system for processing one workflow or a first predetermined code indicating that said workflow processing is defined in another definition information set.

18. A workflow management system according to claim 16, wherein said storage unit further includes a table having a process management information set including a utilization permission flag indicative of whether or not each of said plurality of definition information sets may be copied.

19. A workflow management system according to claim 16, wherein said storage unit further includes a table having a suspended work information set including an ID of one of said plurality of works to be circulated, and a workflow ID indicative of a workflow in which said one work should be suspended.

20. A workflow management system according to claim 19, wherein circulation of said one suspended work is resumed in accordance with input information from a terminal connected to said system.

21. A workflow management system for controlling circulation of electronic circulation information for work to be performed by users at a plurality of nodes connected through a network to said workflow management system, comprising:

means for dividing a circulation route into a first circulation route and a second circulation route;

means for storing workflow management information defining a circulation route of said electronic circulation information, said workflow management information including first circulation control information defining said first circulation route being a part of said circulation route and second circulation control information defining said second circulation route inclusive of said first circulation route defined by said first circulation control information; and circulation controlling means for controlling circulation of said electronic circulation information among said plurality of nodes on the basis of said workflow management information stored in the storing means.

22. A workflow management system according to claim 21, further comprising circulation information definition means for defining said circulation control information and for storing defined circulation control information into said storing means.

23. A workflow management system according to claim 21:

wherein said first circulation control information includes a first definition table storing node identification information for identifying nodes belonging to the partial circulation route which are stored in order of circulation; and wherein said second circulation control information includes a second definition table storing node identification information for nodes of the circulation route other than nodes belonging to the partial circulation route which are stored in order of circulation.

24. A workflow management system according to claim 23 wherein each of said first and second definition tables includes flags for each respective node indicating a status of work to be performed at the node.

25. A workflow management system according to claim 21, further comprising means for storing a process management information indicating whether or not each of the first and second circulation control information can be used for circulation of another electronic circulation information.

26. A workflow management system for managing a workflow or main subprocess, said main subprocess including a plurality of subprocesses at an upper hierarchical level, at least one of the subprocesses at the upper hierarchical level including a plurality of subprocesses at a lower hierarchical level, said workflow management system comprising:

means for dividing said main subprocess into said plurality of subprocesses;

means for storing a definition information set for each of a plurality of the subprocesses for workflow management, each definition information set including:

a process name or process ID identifying the subprocess;

an indication as to whether the subprocess includes one or more subprocesses at a lower hierarchical level; and an identification of the lower hierarchical subprocesses if the subprocess includes one or more lower level subprocesses.

27. A workflow management system for managing a workflow or a main subprocess, said main subprocess including a plurality of subprocesses at an upper hierarchical level, at least one of the subprocesses at the upper hierarchical level including a plurality of subprocesses at a lower hierarchical level, said workflow management system comprising:

means for dividing said main subprocess into said plurality of subprocesses;

means for storing a definition information set for each of a plurality of the subprocesses for workflow management, each definition information set including:

a process name or process ID identifying the subprocess;

an indication as to whether the subprocess includes one or more subprocesses at a lower hierarchical level;

an identification of the lower hierarchical subprocesses if the subprocess includes one or more lower level subprocesses; and management information including for each of a plurality of subprocesses: one or more management fields for managing subprocess; a supervisor ID identifying a supervisor or person assigned to the subprocess; wherein one or more management functions for each subprocess may be performed only by the supervisor assigned to the subprocess.

28. The workflow management system of claim 27 wherein the management functions include one or more of:

modifying the subprocess, suspending and resuming the subprocess and copying the subprocess.

29. The workflow management system of claim 27 wherein the management fields include one or more of:

a utilization permission flag indicating whether or not the subprocess may be copied or used; and a suspension flag indicating whether or not the subprocess has been suspended.

* * * * *